United States Patent
Nishida et al.

[11] Patent Number: 6,040,789
[45] Date of Patent: Mar. 21, 2000

[54] DATA CONVERSION SYSTEM

[75] Inventors: Takanobu Nishida; Ichiro Jikuhara, both of Tokyo, Japan

[73] Assignee: Nippon Steel Corp., Tokyo, Japan

[21] Appl. No.: 08/958,395

[22] Filed: Oct. 27, 1997

[30] Foreign Application Priority Data

Oct. 24, 1996 [JP] Japan ......................................... 284956

[51] Int. Cl.[7] ................................................... H03M 7/00
[52] U.S. Cl. ............................................................. 341/50
[58] Field of Search ................................. 341/50, 51, 94, 341/95; 358/403, 442; 386/81

[56] References Cited

U.S. PATENT DOCUMENTS 5,854,691 12/1998 Lim et al. ................................. 358/403

*Primary Examiner*—Brian Young
*Attorney, Agent, or Firm*—Rabin & Champagne P.C.

[57] ABSTRACT

A data conversion apparatus is able to convert data created by every information processing software program into data of a predetermined common format style without modifying each information processing software program. When an operator enters a data output command, original data created by the information processing software program is transferred through an operating system (OS) to a printer driver. The printer driver converts the original data into bit map data, and then a conversion driver added to the printer driver converts the bit map data into TIFF data. The TIFF data is memorized in a memory together with corresponding original data. If TIFF data is displayed on a screen of a personal computer by using viewer software, data created by every information processing software program can be viewed with ease.

24 Claims, 3 Drawing Sheets

DATA CONVERSION SYSTEM

BACKGROUND OF THE INVENTION

1. Field of the Invention

The present invention relates to a data conversion apparatus and a data conversion system for converting data created by information processing software such as word processing software and spreadsheet software into data of a predetermined common format style.

2. Description of the Related Art

Personal computers, etc. are able to create documents, drawings and spreadsheets by using a variety of information processing software. In the fields of the manufacturing industry, a network is constructed by connecting personal computers disposed on respective departments so that information may be shared. In these fields, it has hitherto been requested for development of a system by which any user can easily view data created by a variety of information processing software with other personal computers. To this end, all information processing software includes a conversion program for converting data created by information processing software into data of a predetermined common format style, and prepare commands for executing such conversion program. Then, when a user views data created by the information processing software, application software which can interpret the data of the predetermined common format style is used.

However, when the data created by the information processing software is converted into data of the predetermined common format style, the information processing software has to be modified as described above, thereby requiring a lot of time and a cumbersome work. Therefore, each time new information processing software is installed in a personal computer, the conversion program has to be included in the information processing software.

SUMMARY OF THE INVENTION

In view of the aforesaid aspect, it is an object of the present invention to provide a data conversion apparatus and a data conversion system which can convert data created by any information processing software into data of a predetermined common format style without modifying each information processing software.

To attain the aforementioned object, there is provided a data conversion apparatus which is comprised of conversion means added to data conversion software, the conversion software for converting original data created by different information processing software into data of a printer output format, the conversion means for converting the data of the printer output format into data of a predetermined common format style, memory means for storing the data of the common format style and the corresponding original data, and screen display means being capable of displaying the data of the common format style stored in the memory means on a screen of a computer.

To attain the aforementioned object, there is also provided a data conversion system which is comprised of a network constructed by connecting a plurality of computers having conversion means added to data conversion software, the conversion software for converting original data created by different information processing software into data of a printer output format, the conversion means for converting the data of the printer output format into data of a predetermined common format style, and memory means for storing the data of the common format style and the corresponding original data, wherein at least one of the plurality of computers includes screen display means capable of displaying on a screen the data of the common format style stored in the memory means.

To attain the aforementioned object, there is further provided a recording medium which is comprised of a program for executing a function to convert output data of data conversion software, which data conversion software converts original data created by different information processing software into data of a printer output format, into data of a predetermined common format style, and a function to store the data of the common format style and the corresponding original data.

To attain the aforementioned object, there is, moreover provided a recording medium which is comprised of a program for executing a function to convert output data of data conversion software, which data conversion software converts original data created by different information processing software into data of a printer output format, into data of a predetermined common format style, a function to store the data of the common format style and the corresponding original data, and a function to display the stored data of the common format style on a screen of a computer.

Since the data conversion software includes the conversion means for converting the data of the printer output format that has been converted by the data conversion software, into the data of the predetermined common format style, the conversion means may convert the data of the printer output format into the data of the predetermined common format style in response to the commands provided by the operating system. Therefore, no conversion program at all is added to the information processing software, and the commercially-available information processing software may be used as it is. Moreover, since the data of the common format style outputted from the conversion means and the corresponding original data are stored, if the data of the common format style is displayed on the screen of the computer by using a screen display means, then it is possible to easily view data created by any information processing software.

Furthermore, since the network is constructed by connecting a plurality of computers having the conversion means, even when the information processing software which creates the data to be viewed is not installed in the computer having the screen display means, or even when the operating system (OS) of the computer is different from that of another computer that created data to be viewed, the computer may receive data of a common format style from the other computer through the network, and may display the data of the common format style on the screen by using the screen display means. Therefore, it is possible to view data created by any information processing software of such other computer with ease.

Incidentally, the information processing software might be word processing software, spreadsheet software or the like. As the data of the common format style, there may be used TIFF, bit map, HPGL (Hewlett-Packard Graphics-Language), CCITT (International Telegraph and Telephone Consultative Committee) group 4 or the like.

DESCRIPTION OF THE PREFERRED EMBODIMENTS

Figure 1:
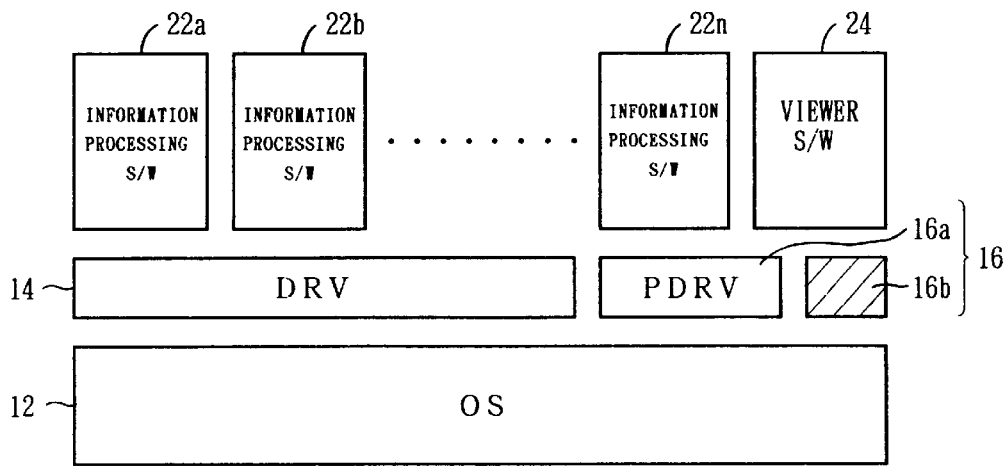
FIG. 1 is a diagram showing software of a personal computer having a data conversion apparatus according to a first embodiment of the present invention.
Figure 2:
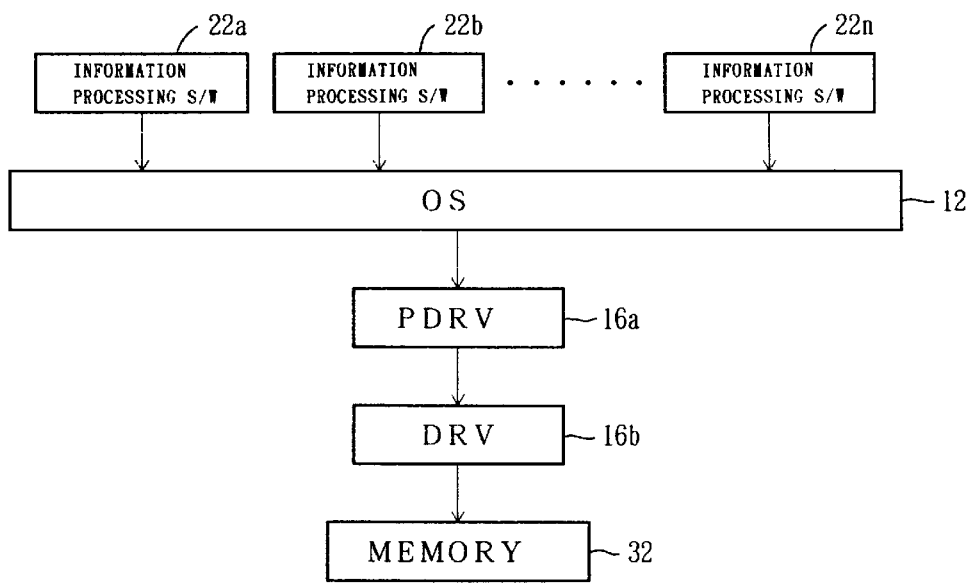
FIG. 2 is a diagram used to explain the manner in which data is converted in the personal computer.

A data conversion apparatus according to a first embodiment of the present invention will hereinafter be described with reference to the drawings. FIG. 1 is a diagram showing software of a personal computer having a data conversion apparatus according to the first embodiment of the present invention. FIG. 2 is a diagram used to explain the manner in which data is converted in such a personal computer.

The data conversion apparatus according to the first embodiment of the present invention is adapted to convert data created by a variety of information processing software of a personal computer, such as document processing software and graphics creation software, into data of a predetermined common format style. An input device such as a keyboard and a mouse and an output device such as a printer are connected to the personal computer.

FIG. 1 shows software of this personal computer. As shown in FIG. 1, this software comprises a computer OS (operating system) 12 and various device drivers 14, 16 illustrated above the computer OS 12. The device drivers 14, 16 are programs used to control peripheral equipment and the like. While the data conversion apparatus according to the present invention may be built in the personal computer as a device driver, the data conversion apparatus according to the present invention is frequently built in the personal computer as a printer driver, by way of example. The device driver 16 is, in particular, a printer driver, and comprises a preexisting printer driver (PDRV) 16a and a conversion driver 16b added to the printer driver 16a. The printer driver 16a can convert original data created by different information processing software into data of the format that can be understood by a printer, e.g. bit map data. On the other hand, the newly-added conversion driver 16b converts the bit map data that has been, converted by the printer driver 16a, into data of a predetermined common format style. Since this conversion driver 16b is operated on the OS (operating system) 12, the conversion of data is executed in response to commands provided by the operating system. That is, the conversion driver 16b converts data under control of the OS together with the printer driver 16a. TIFF (Tag Image File Format) data is used as the data of the common format style. The data of the common format style is outputted to a memory of a personal computer, and stored in the memory in association with corresponding original data. Specifically, the data of the common format style and the corresponding original data are archived by using the same file name with different extensions. For example, the TIFF data is managed by a file "0000. TIF", and the corresponding original data is managed by a file "0000. DOC". Thus, data of different formats can be easily discriminated with respect to the files of the same content.

On the upper layer of FIG. 1, above the device drivers 14, 16, there are illustrated a variety of application software, including information processing software 22a, 22b, . . . , 22n and viewer software 24. For example, the information processing software 22a is word processing software, and the information processing software 22b is spreadsheet software. The viewer software 24 can interpret the TIFF data and display the TIFF data stored in the memory, on the screen of the personal computer.

The manner in which the data conversion apparatus according to the first embodiment converts data will be described below. Let it now be assumed that an operator creates data with certain information processing software by operating a personal computer. Then, when the operator enters a data output command after the operator has finished the work of creating the data, the printer driver (PDRV) 16a and the conversion driver (DRV) 16b are activated, and as shown in FIG. 2, original data created by the information processing software is transferred through the operating system (OS) 12 to the printer driver (PDRV) 16a. Initially, the printer driver (PDRV) 16a converts the original data into bit map data, and then the conversion driver (DRV) 16bconverts the bit map data into TIFF data. Thereafter, the TIFF data is associated with corresponding original data and stored in the memory 32. Incidentally, although the printer driver 16aand the conversion driver 16b separate processing data, it is frequently observed that the printer driver 16a and the conversion driver 16b output the TIFF data together. For example, the conversion driver 16b may convert the original data into the bit map data and may convert the bit map data into the TIFF data.

When the operator views the data created by the information processing software, the operator activates the viewer software 24 and designates predetermined TIFF data. Then, the viewer software 24 reads out the predetermined TIFF data from the memory 32 and displays the TIFF data thus read out on the screen of the personal computer. Naturally, if the operator activates the information processing software which created the data and reads out the original data from the memory 32, then the operator can view such data.

In the data conversion apparatus according to the first embodiment, since the conversion driver for converting the bit map data into the TIFF data is added to the existing printer driver, the conversion driver may be operated on the operating system (OS), and hence the bit map data can be converted into the TIFF data in response to the commands provided by the operating system. Accordingly, the information processing software need not have any additional conversion programs, and information processing software which is commercially available on the market may be used as it is. Also, even when commercially-available software is modified by upgrades or the like, such software may be used as it is. Furthermore, if the TIFF data is stored in the memory together with the corresponding original data, when the operator activates the viewer software and reads out predetermined TIFF data from the memory, it is possible for the operator to view the data created by any information processing software with ease.

Figure 3:
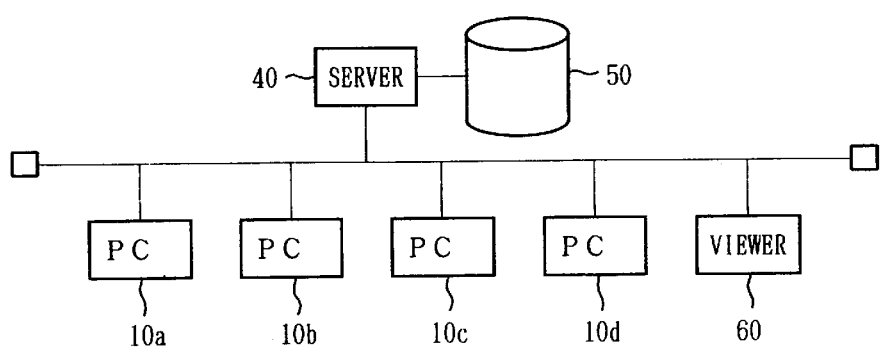
FIG. 3 is a functional block diagram showing a data conversion system according to a second embodiment of the present invention.
Figure 4:
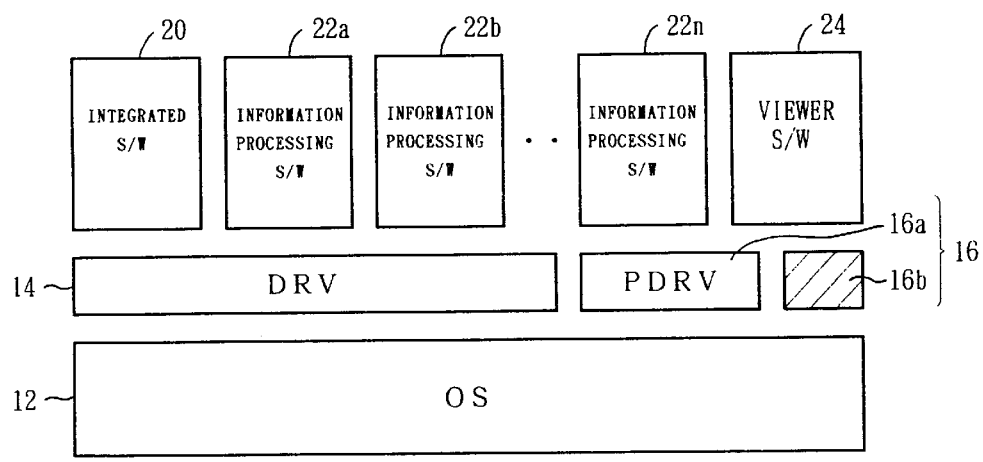
FIG. 4 is a diagram showing software of a personal computer of the data conversion system.

A second embodiment according to the present invention will be described next with reference to the drawings. FIG. 3 is a schematic functional block diagram showing a data conversion system according to the second embodiment of the present invention. FIG. 4 is a diagram showing software of a personal computer of the data conversion system. In the second embodiment, elements and parts identical to those of the first embodiment are marked with the same references, and therefore need not be described in detail.

As shown in FIG. 3, this data conversion system constructs a network by connecting a plurality of personal computers (PC) 10a, 10b, 10c, 10d, a server 40, a database 50 and a viewer 60. Such data conversion system is utilized in the fields of the manufacturing industry as a PDM system (product data management system) for sharing information. For example, the personal computers (PC) 10a, 10b, 10c, 10d are disposed at a planning/design department, a manufacturing department, and a production control department, a sales department, respectively. The data conversion apparatus according to the first embodiment is built in each of the personal computers (PC) 10a, 10b, 10c, 10d.

Software of each of the personal computers 10a, 10b, 10c, 10d will be described below. As shown in FIG. 4, there is provided the computer operating system (OS) 12 on which there are provided various device drivers 14, 16. The device driver 16 is the printer driver, and comprises the existing printer driver 16a and the conversion driver 16b added to the existing printer driver 16a. The conversion driver 16b is adapted to convert bit map data, which is converted by the printer driver 16a, into TIFF data. The TIFF data is stored in the memory together with corresponding original data.

On the upper layer of FIG. 4, above the device drivers 14, 16, there are illustrated *** a variety of application software, including the integrated software 20, the information processing software 22a, 22b, ..., 22n and the viewer software 24. The integrated software 20 has a network function, and manages the information processing software program 22a, 22b, ..., 22n and the viewer software 24 from the activation to the end thereof. The integrated software 20 includes file management software for managing data created by each of information processing software programs 22a, 22b, ..., 22n. Thus, the TIFF data converted by the conversion driver 16b and the corresponding original data are associated with each other, and archived in the memory under the same file name with different extensions. Also, management information (attribute information) of that file is stored in the database 50. If the TIFF data and the corresponding original data are associated with each other and stored in the memory, then when the operator activates the information processing software programs 22a, 22b, ..., 22n and designates a predetermined file name by using the integrated software 20, original data can automatically be read out from the memory. On the other hand, when the operator activates the viewer software 24 and designates a predetermined file name by using the integrated software 20, TIFF data can automatically be read out from the memory.

Incidentally, the same information processing software programs is not always installed in the personal computers 10a, 10b, 10c, 10d, and it is frequently observed that information processing software that is installed in a particular personal computers is not installed in other personal computer.

The server 40 manages the request from each of the personal computers 10a, 10b, 10c, 10d to the database 50 according to a DBMS (database management system). The database 50 archives attribute information of files managed by the respective personal computers 10a, 10b, 10c, 10 d. The attribute information contains the name of information processing software which created data, the name(s) of creator(s), the time of creation of data contained in each file and the place in which file is stored, etc. As described above, in the data conversion system according to the second embodiment of the present invention, data created by the information processing software 22a, 22b, ..., 22n of the personal computers 10a, 10b, 10c, 10d are managed in a centralized fashion by an object-oriented data management, thereby resulting in information being shared.

The viewer 60 is a personal computer including viewer software exclusively-used to view data created by the information processing software programs 22a, 22b, ..., 22n of the personal computers 10a, 10b, 10c, 10d. The integrated software 20 and the viewer software 24 are installed in this viewer 60 as application software.

Figure 5:
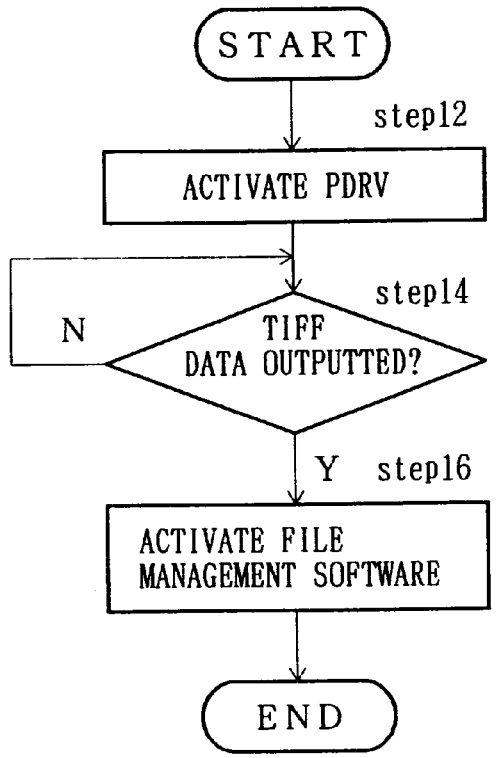
FIG. 5 is a flowchart to which reference is made in explaining the manner in which data is converted by the data conversion system.

The manner in which the data conversion system according to this embodiment converts data will be described with reference to FIG. 5. FIG. 5 is a flowchart to which reference will be made in explaining the manner in which data is converted by the data conversion system. Let us consider the case in which the operator operates one personal computer 10a.

Initially, when the operator activates the integrated software 20 and selects the predetermined information processing software 22a on the screen of the personal computer 10a, the information processing software 22a thus selected is activated. If the operator selects a command, e.g. "END" of the integrated software 20 after the operator has finished creating data by the information processing software 22a, then the integrated software 20 ends the information processing software programs 22a, and activates the printer driver 16a and the conversion driver 16b (step 12) in accordance with the flowchart of FIG. 5. The printer driver 16a converts original data created by the information processing software programs 22a into bit map data, and then the conversion driver 16b converts the bit map data into TIFF data. Then, if the TIFF data is outputted (step 14), the integrated software 20 activates the file management software (step 16). The file management software archives the TIFF data and the corresponding original data in the memory 32 while the TIFF data and the corresponding original data are associated with each other, and stores attribute information thereof in the database 50.

Figure 6:
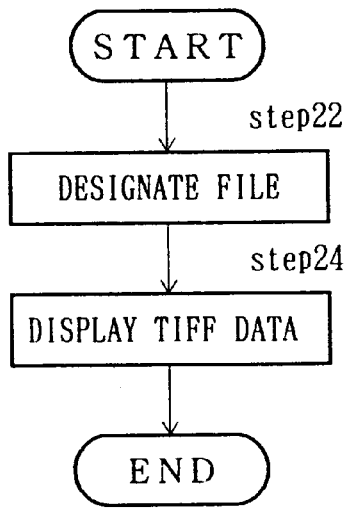
FIG. 6 is a flowchart to which reference is made in explaining the manner in which a user views data by using a viewer software.

The manner in which the operator views data created by the information processing software program 22a of the personal computer 10a will be described next. FIG. 6 is a flowchart used to explain the manner in which the operator views data by using the viewer software 24. In this case, let us consider the case in which the operator views data by using a personal computer 10b different from the personal computer 10a in which the data is created.

Initially, when the operator activates the integrated software 20 and selects the viewer software 24 on the screen of the personal computer 10b, the viewer software 24 is activated. Then, when the operator designates a predetermined file (step 22), the integrated software 20 requests the transmission of data which can be interpreted by the viewer software 24, i.e. TIFF data to the server 40. The server 40 recognizes, based on the attribute information stored in the database 50, that a place in which the file is stored is a memory of the personal computer 10a, and sends a command to the personal computer 10a such that the personal computer 10a may transmit the TIFF data to the personal computer 10b. In this fashion, the predetermined TIFF data is transmitted to the personal computer 10b and displayed on the screen of the personal computer 10b (step 24).

When the personal computer 10b has the information processing software program 22a installed therein, the information processing software program 22a is activated and data can be accessed. In this case, when the operator activates the integrated software 20 and selects the information processing software program 22a on the screen of the personal computer 10b, the information processing software 22a is activated. Then, when the operator designates a predetermined file, the integrated software 20 requests the transmission of data that can be interpreted by the information processing software program 22a, i.e. original data to the server 40. Then, in response to a command from the server 40, predetermined original data is transmitted from the personal computer 10*a* to the personal computer 10*b* and thereby displayed on the screen of the personal computer 10*b*.

Incidentally, the viewer 60 is able to view data in the same way as in the case in which the viewer software 24 of the personal computer is activated as described above.

Since the data conversion system according to the second embodiment constructs the network by connecting a plurality of personal computers having the data conversion apparatus according to the first embodiment, the data conversion system according to the second embodiment can achieve the same effects as can the data conversion apparatus according to the first embodiment. In addition, even when the personal computer does not have installed the information processing software that created data to be viewed or even when the personal computer has the operating system (OS) different from that of other personal computer which created data to be viewed, the personal computer may receive TIFF data from other personal computer through the network and may display the TIFF data on the screen thereof by using the viewer software. Therefore, the personal computer is able to easily view data created by any information processing software the other personal computers.

Further, since the viewer which is exclusively-used to view data is built in the network, any user may view data easily by using the viewer. Furthermore, the data conversion system according to the second embodiment is operated on the integrated software program for managing each information processing software and the viewer software and managing data, whereby the TIFF data converted by the conversion driver and the corresponding original data may be managed in association with each other. Thus, the data conversion system may become easier to use, and may achieve its maximum.

The present invention is not limited to the above-mentioned embodiments and may take various modifications without departing from the gist of the present invention.

For example, while the conversion driver is added to the printer driver for converting the original data created by each information processing software program into bit map data as described above with reference to the first and second embodiments, the present invention is not limited thereto, and the printer driver to which the conversion driver is added may be of such a type as to convert the original data into data of printer output format other than a bit map. In this case, as the conversion driver, one may be used which is able to convert the data of printer output format into data of a predetermined common format style.

Further, while the TIFF is used as the common format style as described above in the first and second embodiments, the present invention is not limited thereto, and the common format style may be a bit map, an HPGL (Hewlett-Packard Graphics-Language), a CCITT (International Telegraph and Telephone Consultative Committee) group 4 and the like, as long as it can be interpreted by the viewer software.

Furthermore, in the above-mentioned second embodiment, the viewer software need not be installed in every personal computer. It need only be installed in at least one personal computer.

The program which executes the operation described in the first and second embodiments is wholly or partly recorded or stored in a portable computer readable medium, such as a floppy disk or a CD-ROM (compact disc read-only memory), and a storage device such as a hard disk. Such a program is read out by the computer and the operation is wholly or partly executed.

As described above, since the data conversion software includes a converting means (or performs data conversion function) to convert the data of the printer output format converted by the data conversion software into data of the predetermined common format style, the converting means may convert the data of the printer output format into data of the predetermined common format style in response to the commands provided by the operating system. Therefore, any conversion program is not added to the information processing software at all, and a commercially-available information processing software program may be used as it is without modification. Unlike the prior art in which conversion software must be changed each time the commercially-available information processing software is modified by an upgrade according to the present invention and unlike the prior art, since the data conversion is executed in response to the commands provided by the operating system, changing software is not required. In addition, since the data of the common format style outputted from the converting means and the corresponding original data are stored, if the data of the common format style is displayed on the screen of the computer by using a displaying means, then it is possible to easily view data created by any information processing software.

Furthermore, since the network is constructed by connecting a plurality of computers having the converting means, even when the information processing software which creates the data to be viewed is not installed in one computer or even when the operating system (OS) of one computer is different from that of another computer that created data to be viewed, one computer may receive data of a common format style from other computers through the network, and may display the data of the common format style on the screen by using the displaying means. Therefore, it is possible to view data created by any information processing software of another computer with ease.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A data conversion apparatus, comprising:
   conversion means for converting original data created by any of a plurality of different information processing programs into printer output format data;
   means for converting the printer output format data to data of a predetermined common format;
   means for storing the common format data and the corresponding original data; and
   means for visually displaying the stored common format data.

2. A data conversion apparatus as claimed in claim 1, wherein the data of the common format style and the corresponding original data are stored in said storing means in association with each other.

3. A data conversion apparatus as claimed in claim 1, wherein the conversion means is a printer driver.

4. A data conversion system comprising:
   a network of a plurality of connected computers, said computers each having data conversion software for converting original data created by any of a plurality of different information processing software programs into data of a printer output format, and means for converting the data of the printer output format into data of a predetermined common format; and means for storing the converted common format data and the corresponding original data, wherein at least one of said plurality of computers includes means for visually displaying the stored common format data.

5. A data conversion system as claimed in claim 4, wherein the common format data and the corresponding original data are stored in association with each other.

6. A data conversion system as claimed in claim 4, wherein the data conversion software is a printer driver.

7. A computer-readable recording medium having stored therein a program for executing:

a conversion function to convert printer output format data to data of a predetermined common format; and a function to store the common format data and corresponding original data.

8. A computer-readable recording medium as claimed in claim 7, wherein the conversion function includes a printer driver.

9. A computer-readable recording medium having stored therein a program for executing:

a conversion function to convert printer output format to data of a predetermined common format;

a function to store the data of the common format style and corresponding original data; and a function to display the stored data of the common format style on a computer screen.

10. A computer-readable recording medium as claimed in claim 9, wherein the conversion function includes a printer driver.

11. A computer-readable recording medium as claimed in claim 9, wherein the conversion function includes a function to convert original data, created in any of a plurality of data formats by any of a plurality of different information processing software programs, to data of a printer output format, and a function to convert the printer output format data to data of a predetermined common format.

12. A computer-readable recording medium as claimed in claim 7, wherein the conversion function includes a function to convert original data, created in any of a plurality of data formats by any of a plurality of different information processing software programs, to data of a printer output format, and a function to convert the printer output format data to data of a predetermined common format.

13. A data conversion apparatus, comprising:

means for converting original data in any of a plurality of different information processing software formats to printer output format data, and for converting the printer output format data into data of a predetermined common format;

means for storing the common format data and the corresponding original data; and means for displaying on a computer screen the stored common format data.

14. A data conversion apparatus as claimed in claim 13, wherein the common format data and the corresponding original data are stored in association with each other.

15. A data conversion apparatus as claimed in claim 13, wherein the data converting means includes a printer driver.

16. A data conversion system, comprising:

a network of connected computers, each computer having means for converting original data created by any of a plurality of different information processing software programs to printer output format data, and for converting the printer output format data to data of a predetermined common format, and means for storing the converted common format data and the corresponding original data, wherein at least one of said plurality of computers includes means for displaying the stored common format data on a screen.

17. A data conversion system as claimed in claim 16, wherein the common format data and the corresponding original data are stored in association with each other.

18. A data conversion system as claimed in claim 16, wherein the data converting means includes a printer driver.

19. A computer-readable recording medium having stored therein a program for executing:

a conversion function to convert original data created by any of a plurality of different information processing software programs to printer output format data, and to convert the printer output format data into data of a predetermined common format; and a function to store the converted common format data and the corresponding original data.

20. A computer-readable recording medium as claimed in claim 19, wherein the program stored in the medium includes a printer driver.

21. A computer-readable recording medium having stored therein a program for executing:

a conversion function to convert original data created by any of a plurality of information processing software programs to printer output format data, and to convert the printer output format data to data of a predetermined common format;

a function to store the converted common format data and the corresponding original data; and a function to display the stored common format data on a computer screen.

22. A computer-readable recording medium as claimed in claim 21, wherein the program stored in the medium includes a printer driver.

23. A data conversion apparatus, comprising:

a printer driver;

means, responsive to printer output format data created by the printer driver, for converting the printer output format data into data of a predetermined common format;

means for storing the converted common format data and the corresponding original data; and means for displaying on a computer screen the stored common format data.

24. A data conversion apparatus as claimed in claim 23, wherein the converted common format data and the corresponding original data are stored in association with each other.

* * * * *